UNITED STATES PATENT OFFICE.

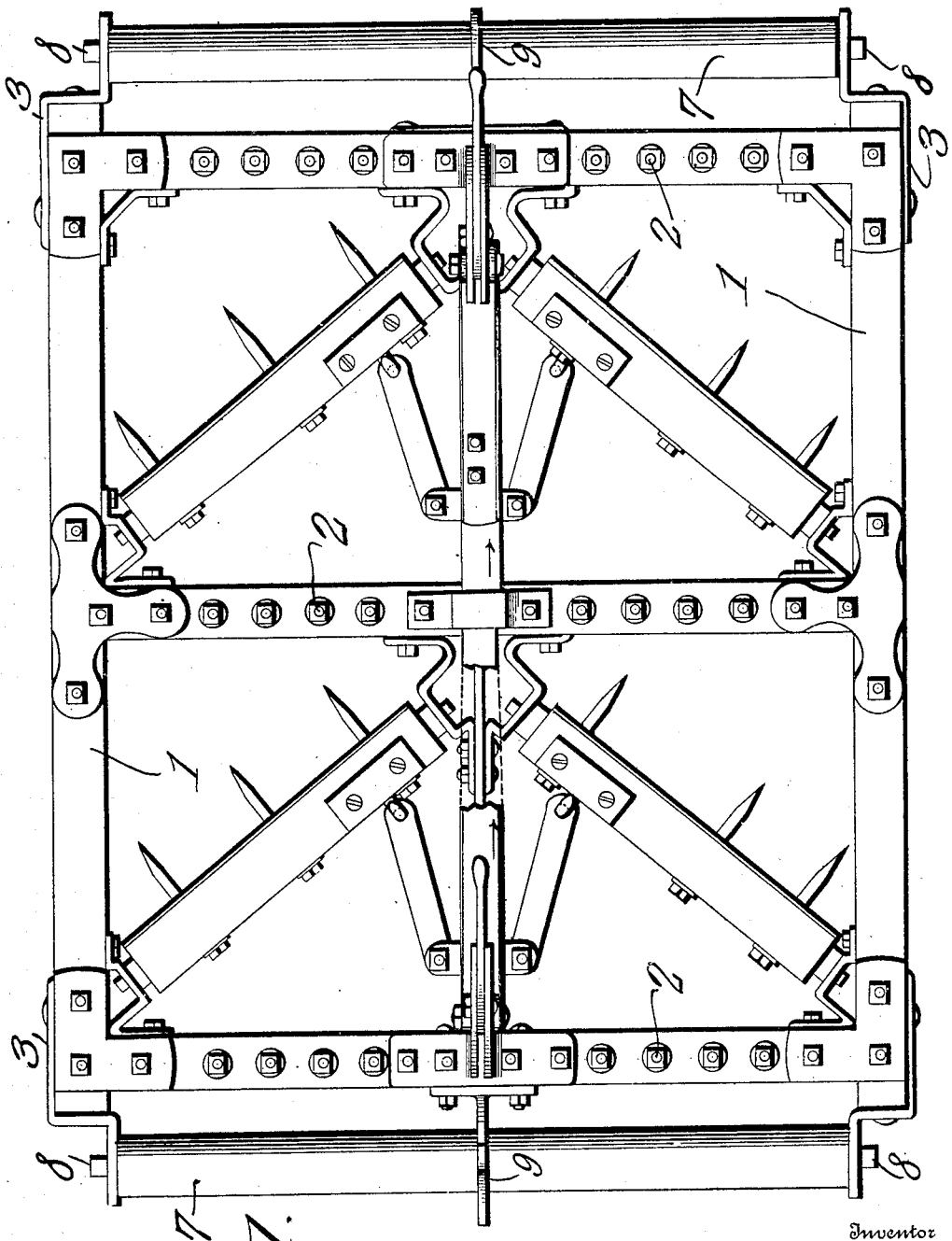

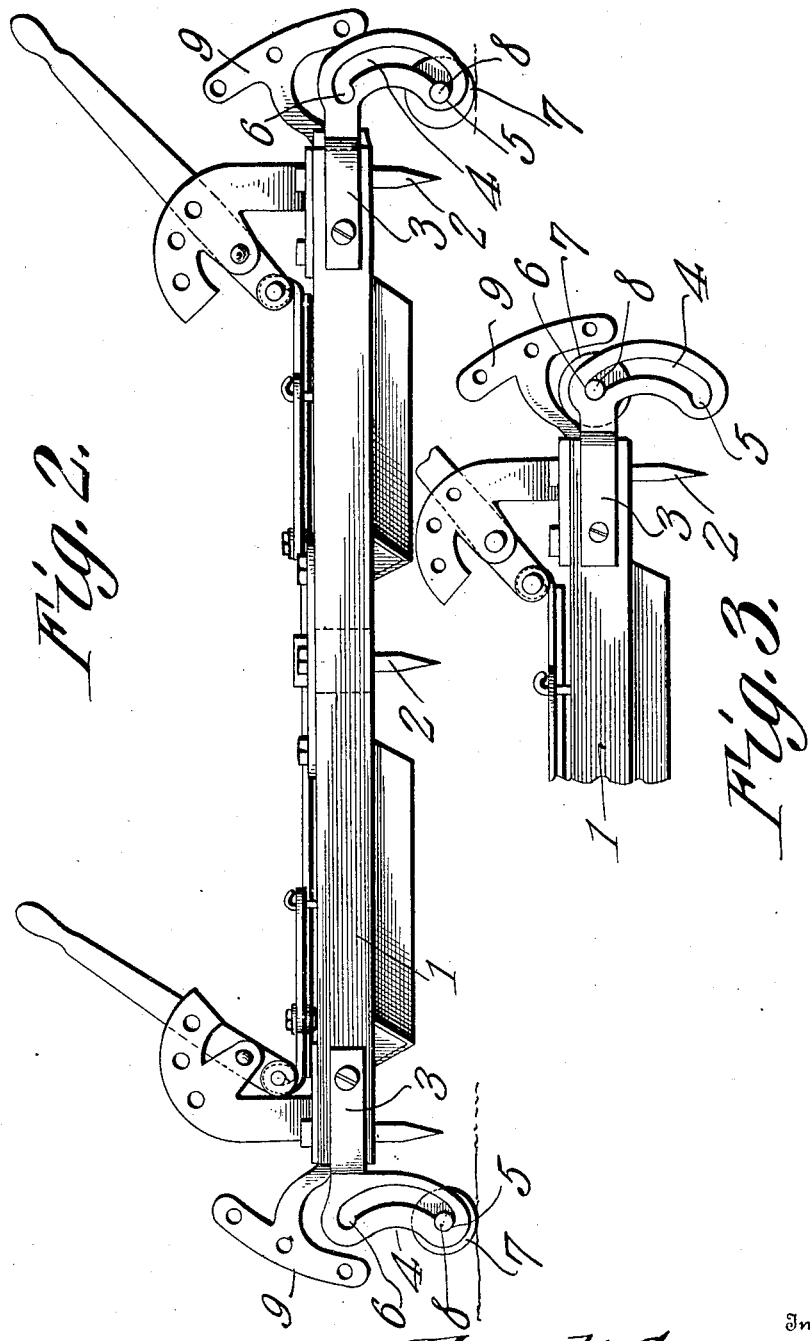

FRANK GERMON, OF LEADVILLE, COLORADO.

HARROW.

No. 913,639.　　　　Specification of Letters Patent.　　　Patented Feb. 23, 1909.

Application filed January 18, 1908. Serial No. 411,523.

*To all whom it may concern:*

Be it known that I, FRANK GERMON, a citizen of the United States, residing at Leadville, in the county of Lake and State of Colorado, have invented a new and useful Harrow, of which the following is a specification.

This invention has relation to harrows and it consists in the novel construction and arrangement of its parts as hereinafter shown and described.

The object of the invention is to provide a harrow with rollers at its forward and rear ends which are so mounted as to automatically rise or fall in order to relatively elevate or lower the harrow. That is to say, when the implement is drawn in one direction the rollers are automatically elevated and the harrow member is correspondingly lowered so that its teeth may engage the ground. When the harrow is drawn in the opposite direction the rollers are automatically lowered and the harrow member is correspondingly elevated so that its teeth are raised above the surface of the ground and the implement may be readily transported from place to place. The automatic movement of the rollers in vertical directions is accomplished through the instrumentality of peculiar guides attached to the harrow and which are engaged by the shaft of the rollers.

Figure 1 is a top plan view of the harrow. Fig. 2 is a side elevation of the same showing the rollers in their lowermost positions, and Fig. 3 is a side elevation of one end of the harrow showing the rollers in an elevated position.

The harrow 1 may be of any desired style or configuration and is provided with the usual teeth 2. The brackets 3 are attached to the front and rear ends of the harrow 1 and the said brackets are provided with the arcuate guides 4 which terminate at their lower ends in the bearings 5 and at their upper ends in the bearings 6. The chords of the arcs which the said guides 4 describe are vertically disposed and the guides 4 of the forward brackets 3 are parallel with the guides 4 of the brackets at the rear end of the harrow. A roller 7 is located at the forward and rear ends respectively of the harrow 1 and the shafts 8 of the said rollers enter the guides 4 of the brackets 3 and are adapted to rotate in the bearings 5 or 6 according to the direction in which the harrow 1 is moved. The harrow 1 is provided at its opposite ends with the clevis supports 9 to either one of which a team of draft animals may be attached for the purpose of drawing the implement.

The harrow is operated as follows: When it is desired that the teeth 2 shall engage the ground the draft animals are attached to the clevis support 9 which is located in front of the concaved edges of the guides 4. Consequently, as the harrow 1 is moved over the surface of the ground the shafts 8 will work up along the guides 4 and eventually will enter the upper bearings 6. Thus, the rollers will operate upon the surface of the ground and regulate the depth at which the teeth 2 will work in the soil. When it is desired to remove the harrow from the field without permitting the teeth 2 to engage the ground the draft animals are connected to the clevis support 9 at the opposite end of the harrow when the shafts 8 will work down through the guides 4 and enter the lower bearings 5. Thus, the harrow 1 is bodily elevated and will remain in such position so long as the harrow is being moved by a pull exerted from the convex edges of the guide 4 and may be readily transported from place to place without having the teeth 2 in contact with the ground.

Having thus described my invention, what I claim as new and desire to secure by Letters-Patent is:

A harrow comprising a frame, brackets secured to the ends thereof, said brackets having arcuate guides, the guides at the two ends of the frame being parallel and the chords thereof being substantially vertical or perpendicular to the frame, there being recesses extending in the same direction from the upper and lower ends of the guides and constituting upper and lower bearings, and rollers at the ends of the frame and journaled at their ends in the guides, said rollers and brackets constituting means for automatically raising the frame when draft is applied to one end thereof and seating the ends of the rollers in the lower bearing recesses, and for automatically lowering the frame when draft is applied to the opposite ends thereof and seating the ends of the rollers in the upper bearing recesses.

In testimony that I claim the foregoing as my own, I have hereto affixed my signature in the presence of two witnesses.

FRANK GERMON.

Witnesses:
WILLIAM H. WELLINGTON,
NELSE NELSON.